United States Patent [19]

Jones

[11] 3,773,182

[45] Nov. 20, 1973

[54] CASE FOR FLUID FILTER CARTRIDGE

[76] Inventor: Josh B. Jones, Helena, Ala.

[22] Filed: Oct. 14, 1971

[21] Appl. No.: 189,165

[52] U.S. Cl.................. 210/321, 210/437, 210/457
[51] Int. Cl............................................. B01d 13/00
[58] Field of Search.............. 210/23, 321, 407–411, 210/422, 437, 438, 445–450, 457

[56] References Cited
UNITED STATES PATENTS

| | | | |
|---|---|---|---|
| 3,386,583 | 6/1968 | Merten | 210/321 |
| 2,598,818 | 6/1952 | Muirhead | 210/448 X |
| 3,568,843 | 3/1971 | Brown | 210/321 |
| 3,655,059 | 4/1972 | Johnson | 210/446 |
| 3,367,504 | 2/1968 | Westmoreland | 210/321 |

Primary Examiner—Samih N. Zaharna
Assistant Examiner—Richard W. Burks
Attorney—Hugh P. Carter et al.

[57] ABSTRACT

A filter case for a fluid filter cartridge which comprises a two-part tubular body. Each tube is open at one end and closed at the other end by a head. The open ends fit telescopically and snugly together, tight enough to stand internal pressure on the order of 100 pounds per square inch. The inner walls of the heads are provided with axially alinged tubular sockets into which the inner open ends of which fit the ends of the centrally disposed perforated tube of the filter unit. The head of one of the tubes is provided with a passage therethrough so that clean fluid passing through the filter and into the tube is discharged through said opening. A dirty fluid inlet is provided through the other head, at a point therein removed from the tubular socket, and a concentrate fluid outlet is provided in the head through which the unfiltered fluid in case is discharged.

1 Claim, 4 Drawing Figures

CASE FOR FLUID FILTER CARTRIDGE

My invention relates to a filter case for the reception of a filter cartridge of the kind which has a centrally disposed, perforated tube around which is wrapped, usually in spiral fashion, a filter medium. The specific filter medium or cartridge which I propose to house in my improved case may be purchased from T. J. Engineering Company, Downey, California, or from Gulf Environmental Systems, Los Angeles, California. Generally stated, such cartridge comprises a centrally located tube around which is spirally wound a length of cellulose acetate membrane. Such membrane provides a reverse osmotic filtering of fluid.

An object of my invention is to provide an improved filter case for containing a tube mounted filter medium of the kind indicated which comprises essentially two tubular parts, open at one end and closed at the other, one of the open ends of one of the tubes being telescopically received within the open end of the other, together with tubular sockets on the inner walls of the heads of the tubes which are adapted to receive the projecting ends of the tube located at the center of the filter cartridge.

A further object of my invention is to provide a filter case which may be molded of two, relatively simple tubular parts which fit together telescopically and in fluid tight fashion, permitting the provision of an inexpensive, take-apart or disposable unit.

A more specific object is to provide apparatus of the character indicated in which clean fluid which has passed through the filter medium and thence into the tube is removed from the apparatus by an opening in one of the heads which communicates with the inside of the tubular socket on that head, there being a dirty fluid inlet through the opposite head displaced from the adjacent tubular socket member, and a concentrate fluid outlet through the head, at the end of the apparatus through which the clean or filtered fluid is withdrawn.

Briefly, my invention comprises a pair of tubular members one of which is arranged to receive the end of the other in close fitting, telescopic manner. The tubes may be made of suitable synthetic material such as nylon, polyethelene, polystyrene or the like. On the inner walls of the heads of the tubes, centrally thereof, I provide aligned open ended tubular sockets which are adapted to receive the projecting ends of the centrally located, perforated tube of a spirally wound filter cartridge. Dirty fluid is admitted to the case through one head so that it fills the case. Clean fluid is withdrawn through the opposite head, preferably by a passageway which communicates directly with the central tube of the filter cartridge. A concentrate fluid opening may be provided to communicate with the casing in the head through which the clean or filtered fluid is withdrawn.

Apparatus illustrating features of my invention is shown in the accompanying drawings forming a part of this application, in which.

Figure 1:
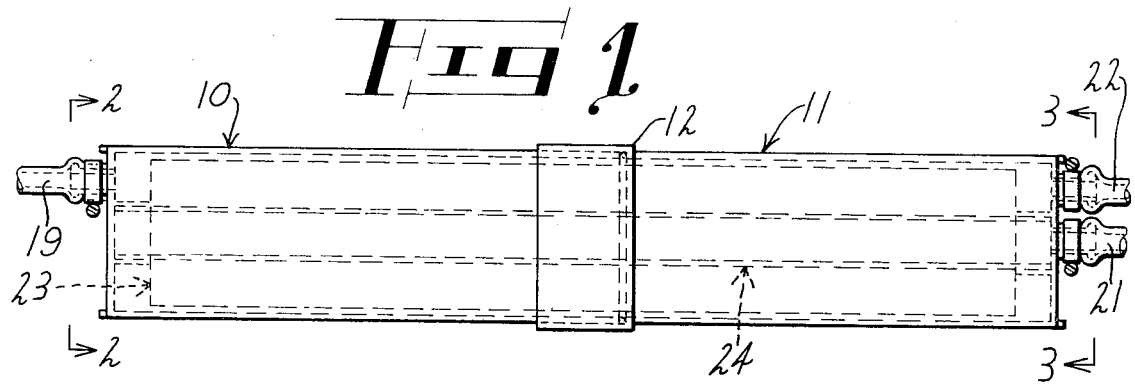
FIG. 1 is a side elevational view with the parts assembled.

Referring now to the drawings for a better understanding of my invention I illustrate the same as embodying a pair of tubular members 10 and 11. As shown, the tubes may be integrally cast or molded of material such as nylon, polyethelene, polystyrene or the like. The tube 11 has at its open end an enlarged section 12 which is adapted telescopically to receive the open end of the tube 10 as shown.

The tube 10 is provided with an integrally formed head 10a while the tube 11 is provided with a similarly disposed, integral head 11a.

On the inner walls of the heads 10a and 11a respectively are inwardly opening, tubular socket members 13 and 14, and these may be integrally cast with the respective heads of the tubes. The head 10a may be provided with a dirty fluid inlet 16 displaced away from the central axis of the tube as shown.

The head 11a is provided with a clean or filtered fluid discharge opening 17 located, preferably, so as to communicate with the socket member 14. A concentrate fluid discharge opening 18 is provided in the head 11a at the place illustrated. Fluid to be filtered is supplied to the inlet 16 through a tube or conduit 19, filtered or clean fluid is removed through a tube or conduit 21 and a concentrate fluid tube 22 is provided to take away fluid passing through the opening 18.

Figure 4:
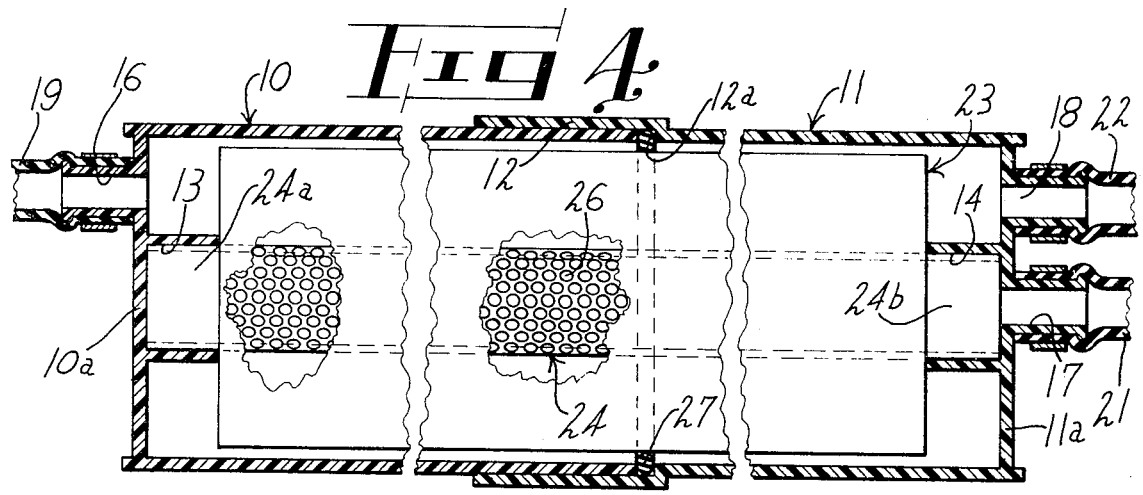
Figure 2:
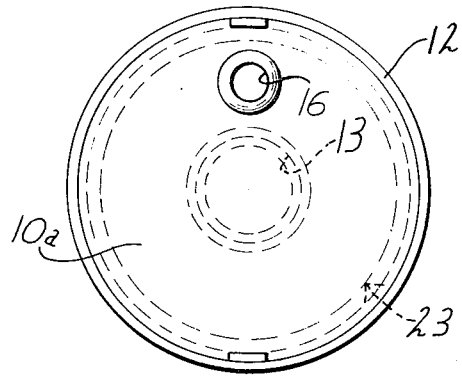
FIG. 2 is an enlarged end elevational view taken generally along line 2—2 of FIG. 1, the fluid supply tube and clamp being omitted.
Figure 3:
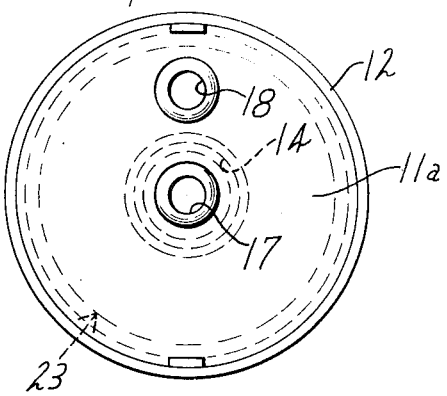
FIG. 3 is an enlarged view taken generally along line 3—3 of FIG. 1, the fluid discharge lines and clamps being omitted; and, FIG. 4 is a longitudinal sectional view, drawn to a larger scale, the view being partly broken away and in section.

A preferred form of filter cartridge is indicated generally by the numeral 23. As stated, this type of cartridge comprises a centrally disposed, open tubular member 24 which has a multitude of perforations 26 extending substantially throughout its length except for the ends 24a and 24b which project beyond the ends of the cartridge proper. The ends 24a and 24b of the tube project snugly into the respective sockets 13 and 14, with the parts assembled as illustrated in FIGS. 1 and 4.

From what has been described it will be seen that the device may be assembled by first placing end 24b of the tube 24 in the socket 14. An O-ring 27 is then placed about the projecting end of the cartridge and the other tubular member is brought into telescopic relation with the first one. This action forces the O-ring to seat against the shoulder 12a and the assembly is completed by bringing the parts to the position shown in FIG. 4. Fluid to be filtered is admitted under pressure, and in the case of water, which is to be filtered for home use, generally at about 40 to 60 pounds per square inch, through the tube 19 and opening 16, thus filling the case. The tube 22 may be provided with a restricting valve, not shown, so that fluid under pressure in the case passes through the filter medium of the filter cartridge 23, thence through the openings 26 into the tube 24 where it is discharged through the head 11a through the opening 17 and tube or conduit 21. While the tubes may be secured together in various ways such as by clamps, plastic welding and the like, I prefer to apply glue to the telescoping portions of the tubes to hold them assembled.

When desired the unit may be flushed to clean the filter cartridge by opening the valve, not shown, controlling flow through the opening 18. The O-ring 27 forces the fluid to flow axially of the cartridge, between the layers thereof, thus to clean it.

My invention is particularly adapted to the filtering of water for home use and as is known the filter medium 23 of the kind described is capable of removing various impurities from water, thus to afford an adequate supply of drinking and cooking water for the average household.

In view of the foregoing it will be seen that I have devised an improved, economical and effective filter case for purifying fluids such as water and the like.

While I have shown my invention in but one form, it will be obvious to those skilled in the art that it is not so limited, but is susceptible of various other changes and modifications without departing from the spirit thereof.

What I claim is:

1. In a case for a filter cartridge, which cartridge has a centrally disposed perforated clean fluid tube and a body of filter material surrounding the tube, the ends of said tube extending past the ends of the filter material,
   a. a pair of tubular body members each having one open end and one end closed by a head, the open ends of the tubular body members being configured for close fitting telescopic connection,
   b. socket members on the inner surfaces of the heads in axial alignment with each other and disposed to receive the extended ends of said tube when the body members are assembled, thereby to hold the filter cartridge centrally disposed within the assembled case,
   c. a dirty fluid inlet through the head of one of the tubular body members and radially offset from the axial center of said tubular body member,
   d. a concentrate fluid discharge opening through the head of the other tubular member,
   e. a single sealing means for sealing the telescoping ends of the tubular body members and for sealing between the outer surface of the cartridge and the inner walls of the tubular members to prevent flow of fluid along the outer surface of the cartridge, and
   f. a clean water discharge opening through said other head in axial alignment with the tube.

* * * * *